(12) United States Patent
Miller et al.

(10) Patent No.: US 9,523,284 B2
(45) Date of Patent: Dec. 20, 2016

(54) ADJUSTED STATIONARY AIRFOIL

(71) Applicants: Edward Len Miller, Jupiter, FL (US);
Stephen Wayne Fiebiger, Jupiter, FL (US); Wes Carl Smith, West Palm Beach, FL (US); Reiner Jochen Digele, Biberstein (CH); Wilm Philipp Hecker, Baden (CH); Andreas Martin Mattheiss, Baden-Wuerttemberg (DE)

(72) Inventors: Edward Len Miller, Jupiter, FL (US);
Stephen Wayne Fiebiger, Jupiter, FL (US); Wes Carl Smith, West Palm Beach, FL (US); Reiner Jochen Digele, Biberstein (CH); Wilm Philipp Hecker, Baden (CH); Andreas Martin Mattheiss, Baden-Wuerttemberg (DE)

(73) Assignee: GENERAL ELECTRIC TECHNOLOGY GMBH (CH)

( * ) Notice: Subject to any disclaimer, the term of this patent is extended or adjusted under 35 U.S.C. 154(b) by 484 days.

(21) Appl. No.: 14/087,946

(22) Filed: Nov. 22, 2013

(65) Prior Publication Data

US 2015/0147169 A1    May 28, 2015

(51) Int. Cl.
| | | |
|---|---|---|
| F01D 5/12 | (2006.01) | |
| F01D 9/04 | (2006.01) | |
| F01D 9/02 | (2006.01) | |
| F01D 5/14 | (2006.01) | |
| F01D 5/20 | (2006.01) | |

(52) U.S. Cl.
CPC . *F01D 9/04* (2013.01); *F01D 5/14* (2013.01); *F01D 5/141* (2013.01); *F01D 5/147* (2013.01); *F01D 5/20* (2013.01); *F01D 9/02* (2013.01); *F01D 9/047* (2013.01); *Y02T 50/673* (2013.01)

(58) Field of Classification Search
None
See application file for complete search history.

(56) References Cited

U.S. PATENT DOCUMENTS

| | | | | |
|---|---|---|---|---|
| 9,297,259 | B2 * | 3/2016 | Miller | F01D 5/141 |
| 2005/0247045 | A1 * | 11/2005 | Francini | F01D 9/041 |
| | | | | 60/233 |
| 2007/0048143 | A1 * | 3/2007 | Noshi | F01D 5/141 |
| | | | | 416/223 R |
| 2007/0177980 | A1 * | 8/2007 | Keener | F01D 5/141 |
| | | | | 416/223 R |
| 2007/0201983 | A1 * | 8/2007 | Arinci | F01D 5/141 |
| | | | | 416/223 R |
| 2007/0231147 | A1 * | 10/2007 | Tomberg | F01D 5/141 |
| | | | | 416/223 R |
| 2007/0286718 | A1 * | 12/2007 | Stampfli | F04D 29/542 |
| | | | | 415/191 |
| 2009/0290987 | A1 * | 11/2009 | Parker | F01D 5/141 |
| | | | | 416/241 R |
| 2010/0068048 | A1 * | 3/2010 | Spracher | F01D 5/141 |
| | | | | 415/208.2 |

(Continued)

*Primary Examiner* — Christopher Verdier
*Assistant Examiner* — Brian O Peters

(57) ABSTRACT

A compressor component having an airfoil with a profile in accordance with Table 1 is disclosed. The compressor component, such as a compressor vane, has a decreased surface area over a portion of the airfoil chord length. The decreased surface area compressor vane operates in conjunction with a compressor blade having an increased surface area.

13 Claims, 3 Drawing Sheets

(56) References Cited

U.S. PATENT DOCUMENTS

| | | | |
|---|---|---|---|
| 2011/0116917 A1* | 5/2011 | Wang | F01D 5/141 415/208.1 |
| 2011/0262279 A1* | 10/2011 | Marini | F01D 5/141 416/223 A |
| 2012/0213631 A1* | 8/2012 | Miller | F01D 5/141 415/208.1 |

* cited by examiner

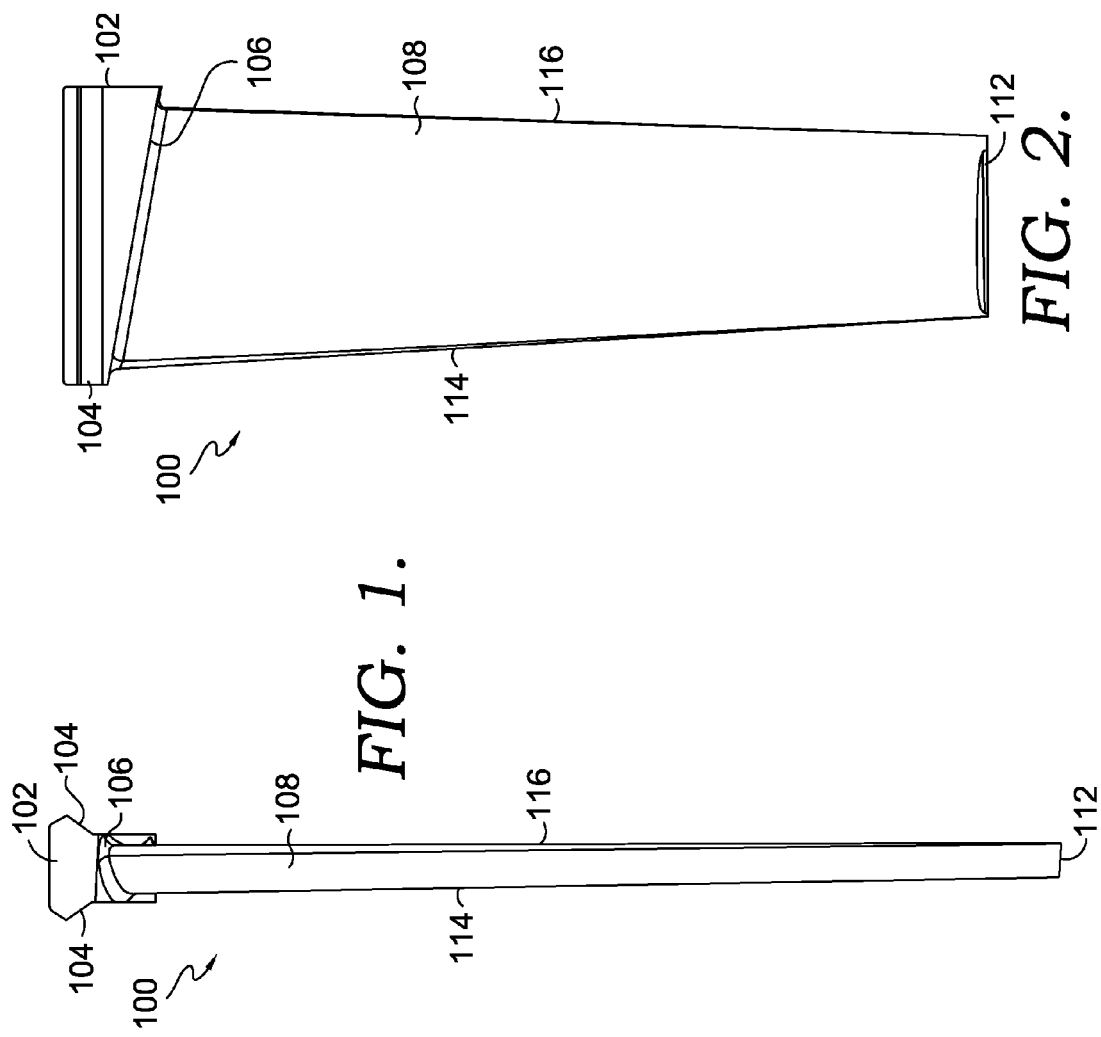

ADJUSTED STATIONARY AIRFOIL

CROSS-REFERENCE TO RELATED APPLICATIONS

The application is related by subject matter to the non-provisional patent application Ser. No. 14/087,935 entitled "ADJUSTED ROTATING AIRFOIL" and assigned to the same assignee.

STATEMENT REGARDING FEDERALLY SPONSORED RESEARCH OR DEVELOPMENT

Not Applicable.

TECHNICAL FIELD

The present invention relates generally to gas turbine engines and more specifically to an airfoil profile having an improved design.

BACKGROUND OF THE INVENTION

A gas turbine engine typically comprises a multi-stage compressor that takes air, which has been drawn into the engine, and compresses it into a higher pressure and temperature. A majority of this air passes to the combustion system, which mixes the compressed and heated air with fuel and contains the resulting reaction that generates the hot combustion gases. These gases then pass through a multi-stage turbine, which, in turn drives the compressor, and possibly a shaft of an electrical generator. Exhaust from the turbine can also be channeled to provide thrust for propulsion of a vehicle.

Typical compressors and turbines comprise a plurality of alternating rows of rotating and stationary airfoils. The stationary airfoils, or vanes, direct the flow of air in a compressor or hot combustion gases in a turbine onto a subsequent row of rotating airfoils, or blades, at the proper orientation in order to maximize the output of the compressor or turbine. The performance of the gas turbine engine is dependent on the mass of air entering the engine. Generally, the greater the amount of air that enters the engine, the more power that is produced.

SUMMARY OF THE INVENTION

The present invention is defined by the claims below. Embodiments of the present invention solve at least the above problems by providing a system and method for, among other things, increasing airflow throughout a plurality of assemblies in a gas turbine engine.

In accordance with the present invention, there is provided a novel and improved airfoil for a stator vane component having a redefined airfoil profile. The surface area of the stator vane is adjusted by decreasing the chord length towards the tip. The change in chord length may be tapered towards the root of the stator vane.

In some aspects of the present invention, the decrease in the chord length of the stator vane corresponds to an increase in a chord length of a rotor blade. For instance, the surface area of the rotor blade may be adjusted in axial length to allow for increased air flow. The chord length of the rotor blade may be increased at the root with the amount of increase tapering towards the tip so as to work in conjunction with the present stator vane. By increasing the surface area of the rotor blade, more air may be captured and harnessed by the airfoil, thus increasing the performance of the compressor and the gas turbine engine.

In an embodiment of the present invention, a compressor component having an attachment, a platform, and an airfoil extending radially from platform disclosed. The airfoil has an uncoated profile substantially in accordance with Cartesian coordinate values of X and Z, for each distance Y in inches set forth in Table 1, carried to three decimal places.

In another embodiment, an airfoil for a compressor vane is disclosed having an uncoated profile substantially in accordance with Cartesian coordinate values X, Y, and Z as set forth in Table 1, carried to three decimal places, where Y is a distance measured in inches, the X and Z coordinate values being joined in smooth continuing splines to form airfoil sections and the airfoil sections joined smoothly to form the profile.

In another embodiment, a compressor is disclosed in which the compressor comprises a compressor casing having a plurality of compressor vanes extending radially inward from the compressor casing. The compressor vanes each have an airfoil with an uncoated nominal profile substantially in accordance with Cartesian coordinate values X, Y, and Z, set forth in inches in Table 1, with the Y coordinate values at perpendicular distances from planes normal to a radius from an engine centerline, wherein airfoil sections are defined at each distance Y by connecting the X and Z coordinate values with smooth continuing splines, and the airfoil sections are joined smoothly to form the airfoil profile. Additionally, the compressor vanes are located adjacent to improved compressor blades, such that a stage of the compressor vanes spaced directly downstream of the blades have an axial length sized to compliment the profile of the blades.

Although disclosed as an airfoil that is uncoated, it is envisioned that an alternate embodiment of the present invention can include an airfoil that is at least partially coated with an erosion resistant coating, corrosion resistant coating, or a combination thereof. In this case, the coordinates of the airfoil as listed in Table 1 would be prior to a coating being applied to any portion of the airfoil.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein:

FIG. 1 is a front elevation view of a stator vane having an airfoil in accordance with an embodiment of the present invention;

FIG. 2 is a side elevation view of the stator vane of FIG. 1;

FIG. 3 is a top elevation view of the stator vane of FIG. 1;

DETAILED DESCRIPTION

Figure 5:
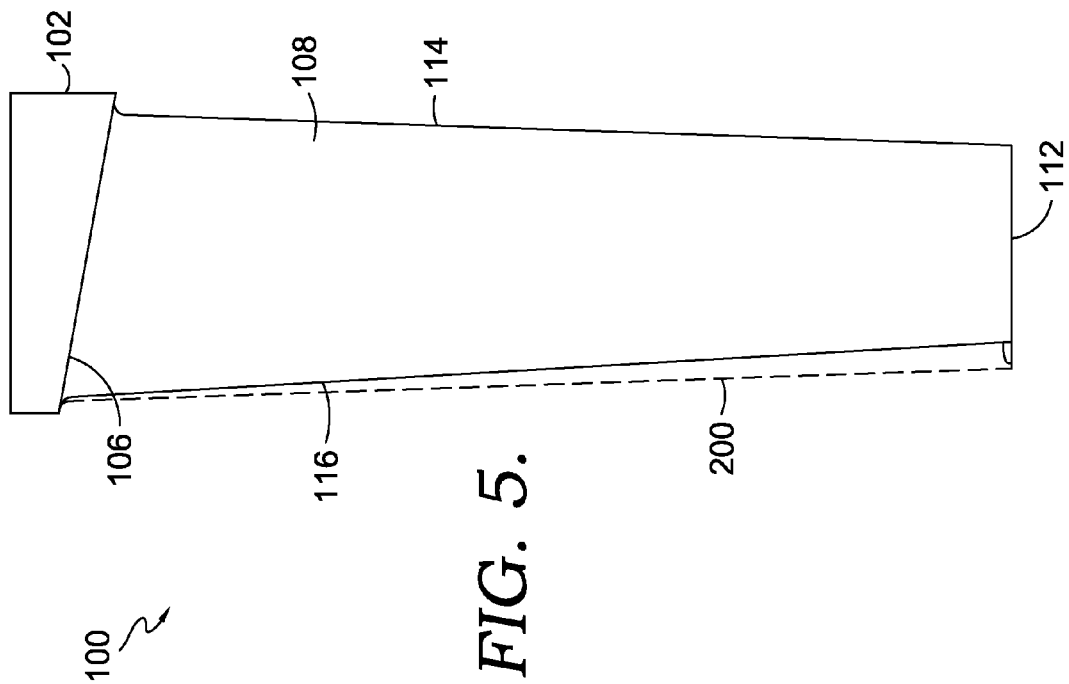
FIG. 5 is a perspective view of a comparison between the airfoil of a stator vane generated by airfoil sections in accordance with the Cartesian coordinates of Table 1 and a prior art stator vane.

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Referring initially to FIGS. 1-3, a stator vane 100 is shown in accordance with an embodiment of the present invention. The stator vane 100 comprises an attachment 102, which can also be referred to as a root. The attachment 102 utilizes one or more attachment surfaces 104 that are oriented so as to correspond with a slot in a compressor casing (not depicted) having a matching profile. That is, the stator vane 100 extends radially inward from the compressor casing, towards an engine centerline. For the stator vane 100, the upper surface of the attachment 102 serves as a platform 106, which aligns with an adjacent surface on the compressor casing to provide a uniform wall surface for the incoming air flow to the compressor.

Extending from the platform 106 is an airfoil 108 having a tip 112, with the tip located at an end of the airfoil 108 opposite of the platform 106. For the stator vane 100, the airfoil is solid, and fabricated from a material such as a martenestic steel alloy. The airfoil has an uncoated profile substantially in accordance with Cartesian coordinate values of X and Z, for each distance Y, in inches, as set forth in Table 1 below, and carried to three decimal places. The distance Y is measured from the engine centerline. The X and Z coordinates are distances relative to coordinate plane origin established at each of the radial Y heights.

A plurality of airfoil sections 110 are established by applying smooth continuing splines between the X, Z coordinate values at each Y height. Smoothly joining each of the airfoil section 110 together form the profile of the airfoil 108. The airfoil 108 can be fabricated by a variety of manufacturing techniques such as forging, casting, milling, and electro-chemical machining (ECM). As such, the airfoil has a series of manufacturing tolerance for the position, profile, twist, and chord that can cause the airfoil 108 to vary by as much as approximately +/−0.012 inches from a nominal state.

The stator vane 100 is generally fabricated from a steel alloy such as 15-5PH, which is a precipitation-hardened, martensitic stainless steel alloy that is used on parts requiring corrosion resistance and high strength at temperatures up to approximately 600 deg. F. While other alloys could be used, it is preferred that a high-temperature steel alloy be selected because of the operating conditions. Although the compressor vane has been discussed as having an attachment, platform, and an airfoil, it is to be understood that all of these features of the vane are typically fabricated from the same material and are most likely integral with one another.

In addition to manufacturing tolerances affecting the overall size of the airfoil 108, it is also possible to scale the airfoil 108 to a larger or smaller airfoil size. However, in order to maintain the benefits of this airfoil shape and size, in terms of stiffness and stress, as will be discussed further below, it is necessary to scale the airfoil uniformly in X and Z directions, but Y direction may be scaled separately.

As previously discussed, the profile generated by the X, Y, and Z coordinates of Table 1 is an uncoated profile. While an embodiment of the present invention is an uncoated stator vane 100, it is possible to add a coating to at least a portion of the airfoil 108 in an alternate embodiment. This coating would have a thickness of up to approximately 0.010 inches. Such coatings can be applied to the airfoil to improve resistance to erosion or to increase temperature capability.

Referring to FIG. 3, positioned at the tip of the stator vane, opposite of the platform, can be a squealer tip 113, which includes a recessed portion so as to minimize the amount of metal located at the vane tip 112. Although, in some embodiments, the stator vane may not include a squealer tip. By minimizing the amount of metal, stator vane 100 can be sized radially to have a tighter fit with the surrounding compressor case such that tolerances can be decreased and efficiency of the compressor increase. Should the squealer tip 113 contact the compressor case and begin to rub the case, the vane will not get as hot due to the smaller amount of material at the vane tip 112.

Depending on the vane configuration, it is possible that a second platform can be positioned proximate the tip 112 of the airfoil 108. A second platform located at the tip 112, is commonly referred to as a shroud and interlocks with a shroud of an adjacent vane. The shrouds provide an outer airpath seal that increases efficiency by preventing air from passing over the vane tip 112 and also serves to reduce the vibration of the airfoils 108. The use of a second platform, or a shroud, is common in airfoils having a relatively long radial length.

Decreasing the surface area of the stator vane may, among other things, correspond to an increased surface area of a compressor blade. For a compressor blade, increasing the surface area near the root of the compressor blade may allow for the compressor blade to take in a larger amount of air than the prior art. By taking in a larger amount of air, more air may be compressed and consequently, more power may be produced by the engine. Complimentary to the increased surface area of the compressor blade, the surface area of the stator vane may be decreased. Decreasing the surface area of the stator vane may allow for the stator vane to clear the compressor blade, preventing a collision between the compressor blade and stator vane.

Figure 4:
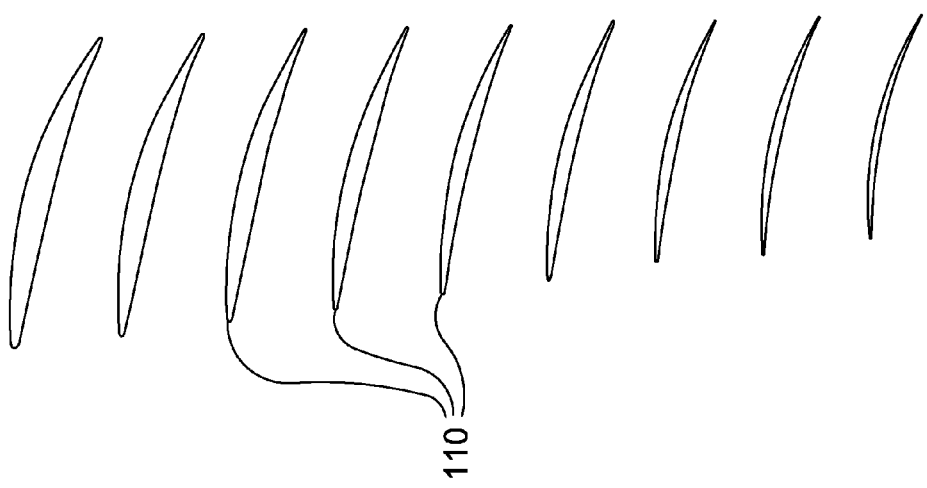
FIG. 4 is a perspective view illustrating a plurality of airfoil sections of a stator vane generated by the Cartesian coordinates of Table 1.
Figure 6:
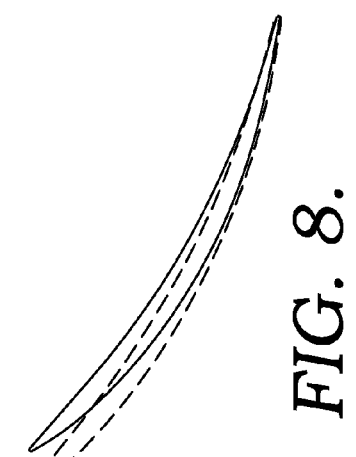
FIGS. 6-8 are enlarged cross sectional views at various radial heights of airfoil sections of a prior art airfoil overlaid with the airfoil of the present invention.
Figure 7:
Figure 8:
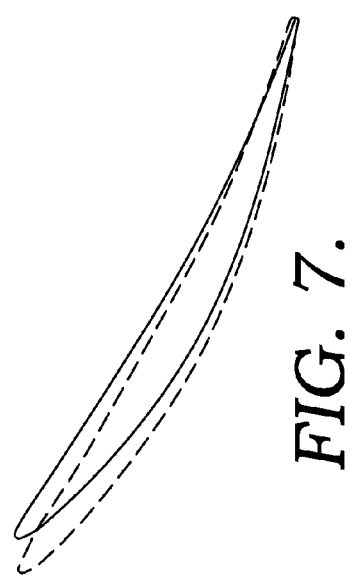

Referring to FIG. 4, a perspective view illustrating a plurality of airfoil sections 110 of a compressor vane generated by the Cartesian coordinates of Table 1 is shown. The modifications to the prior art airfoil, in terms of the decreased chord length of the stator vane, can be seen in more detail in FIGS. 5-8. FIG. 5 is an elevation view depicting the present invention airfoil 108 of a stator vane with solid lines compared to the prior art airfoil 200, shown in dashed lines. From FIG. 5 it can be seen where the airfoil 108 of a stator vane has a decreased chord length. FIGS. 6-8 are enlargements of specific sections of a stator vane depicted in FIG. 5, with FIG. 6 taken at a radial height of approximately Y=25, FIG. 7 taken at a radial height of approximately Y=32, and FIG. 8 taken at a radial height of approximately Y=38.5 from the engine centerline.

TABLE 1

| X | Y | Z |
|---|---|---|
| 1.120 | 24.500 | 1.497 |
| 1.074 | 24.500 | 1.433 |

TABLE 1-continued

| X | Y | Z |
|---|---|---|
| 1.024 | 24.500 | 1.373 |
| 0.971 | 24.500 | 1.314 |
| 0.919 | 24.500 | 1.255 |
| 0.867 | 24.500 | 1.196 |
| 0.815 | 24.500 | 1.137 |
| 0.764 | 24.500 | 1.077 |
| 0.714 | 24.500 | 1.016 |
| 0.664 | 24.500 | 0.955 |
| 0.615 | 24.500 | 0.894 |
| 0.567 | 24.500 | 0.831 |
| 0.520 | 24.500 | 0.768 |
| 0.473 | 24.500 | 0.705 |
| 0.427 | 24.500 | 0.641 |
| 0.382 | 24.500 | 0.576 |
| 0.338 | 24.500 | 0.511 |
| 0.294 | 24.500 | 0.446 |
| 0.251 | 24.500 | 0.380 |
| 0.209 | 24.500 | 0.314 |
| 0.167 | 24.500 | 0.247 |
| 0.126 | 24.500 | 0.179 |
| 0.087 | 24.500 | 0.111 |
| 0.047 | 24.500 | 0.043 |
| 0.009 | 24.500 | −0.026 |
| −0.029 | 24.500 | −0.095 |
| −0.066 | 24.500 | −0.164 |
| −0.102 | 24.500 | −0.234 |
| −0.137 | 24.500 | −0.305 |
| −0.171 | 24.500 | −0.376 |
| −0.205 | 24.500 | −0.447 |
| −0.237 | 24.500 | −0.518 |
| −0.269 | 24.500 | −0.591 |
| −0.300 | 24.500 | −0.663 |
| −0.329 | 24.500 | −0.736 |
| −0.358 | 24.500 | −0.809 |
| −0.386 | 24.500 | −0.883 |
| −0.413 | 24.500 | −0.957 |
| −0.438 | 24.500 | −1.031 |
| −0.463 | 24.500 | −1.106 |
| −0.487 | 24.500 | −1.181 |
| −0.510 | 24.500 | −1.256 |
| −0.531 | 24.500 | −1.332 |
| −0.551 | 24.500 | −1.408 |
| −0.571 | 24.500 | −1.485 |
| −0.589 | 24.500 | −1.561 |
| −0.606 | 24.500 | −1.638 |
| −0.623 | 24.500 | −1.715 |
| −0.640 | 24.500 | −1.792 |
| −0.658 | 24.500 | −1.865 |
| 1.121 | 24.500 | 1.499 |
| 1.122 | 24.500 | 1.502 |
| 1.123 | 24.500 | 1.506 |
| 1.123 | 24.500 | 1.509 |
| 1.122 | 24.500 | 1.513 |
| 1.119 | 24.500 | 1.516 |
| 1.116 | 24.500 | 1.517 |
| 1.112 | 24.500 | 1.518 |
| 1.109 | 24.500 | 1.517 |
| 1.105 | 24.500 | 1.516 |
| 1.103 | 24.500 | 1.515 |
| 1.034 | 24.500 | 1.474 |
| 0.969 | 24.500 | 1.428 |
| 0.905 | 24.500 | 1.379 |
| 0.844 | 24.500 | 1.327 |
| 0.783 | 24.500 | 1.274 |
| 0.724 | 24.500 | 1.219 |
| 0.667 | 24.500 | 1.163 |
| 0.610 | 24.500 | 1.106 |
| 0.554 | 24.500 | 1.048 |
| 0.500 | 24.500 | 0.989 |
| 0.446 | 24.500 | 0.929 |
| 0.393 | 24.500 | 0.869 |
| 0.342 | 24.500 | 0.807 |
| 0.292 | 24.500 | 0.744 |
| 0.242 | 24.500 | 0.681 |
| 0.194 | 24.500 | 0.616 |
| 0.147 | 24.500 | 0.551 |
| 0.102 | 24.500 | 0.485 |
| 0.058 | 24.500 | 0.418 |
| 0.015 | 24.500 | 0.350 |
| −0.027 | 24.500 | 0.281 |
| −0.067 | 24.500 | 0.211 |
| −0.106 | 24.500 | 0.141 |
| −0.144 | 24.500 | 0.070 |
| −0.180 | 24.500 | −0.002 |
| −0.215 | 24.500 | −0.074 |
| −0.249 | 24.500 | −0.147 |
| −0.281 | 24.500 | −0.221 |
| −0.312 | 24.500 | −0.295 |
| −0.342 | 24.500 | −0.369 |
| −0.371 | 24.500 | −0.445 |
| −0.398 | 24.500 | −0.520 |
| −0.424 | 24.500 | −0.596 |
| −0.448 | 24.500 | −0.673 |
| −0.471 | 24.500 | −0.750 |
| −0.493 | 24.500 | −0.827 |
| −0.513 | 24.500 | −0.905 |
| −0.532 | 24.500 | −0.983 |
| −0.550 | 24.500 | −1.062 |
| −0.568 | 24.500 | −1.140 |
| −0.584 | 24.500 | −1.219 |
| −0.599 | 24.500 | −1.298 |
| −0.613 | 24.500 | −1.377 |
| −0.626 | 24.500 | −1.456 |
| −0.639 | 24.500 | −1.536 |
| −0.651 | 24.500 | −1.615 |
| −0.663 | 24.500 | −1.695 |
| −0.672 | 24.500 | −1.774 |
| −0.680 | 24.500 | −1.854 |
| −0.680 | 24.500 | −1.861 |
| −0.680 | 24.500 | −1.865 |
| −0.679 | 24.500 | −1.869 |
| −0.677 | 24.500 | −1.872 |
| −0.674 | 24.500 | −1.874 |
| −0.671 | 24.500 | −1.875 |
| −0.667 | 24.500 | −1.875 |
| −0.664 | 24.500 | −1.874 |
| −0.661 | 24.500 | −1.872 |
| −0.659 | 24.500 | −1.868 |
| 1.168 | 26.100 | 1.599 |
| 1.123 | 26.100 | 1.531 |
| 1.072 | 26.100 | 1.467 |
| 1.020 | 26.100 | 1.404 |
| 0.968 | 26.100 | 1.340 |
| 0.918 | 26.100 | 1.276 |
| 0.868 | 26.100 | 1.211 |
| 0.818 | 26.100 | 1.146 |
| 0.768 | 26.100 | 1.081 |
| 0.718 | 26.100 | 1.016 |
| 0.669 | 26.100 | 0.951 |
| 0.620 | 26.100 | 0.885 |
| 0.572 | 26.100 | 0.819 |
| 0.524 | 26.100 | 0.752 |
| 0.478 | 26.100 | 0.685 |
| 0.432 | 26.100 | 0.617 |
| 0.387 | 26.100 | 0.548 |
| 0.343 | 26.100 | 0.479 |
| 0.300 | 26.100 | 0.410 |
| 0.257 | 26.100 | 0.340 |
| 0.214 | 26.100 | 0.270 |
| 0.173 | 26.100 | 0.199 |
| 0.132 | 26.100 | 0.128 |
| 0.091 | 26.100 | 0.057 |
| 0.051 | 26.100 | −0.014 |
| 0.012 | 26.100 | −0.086 |
| −0.027 | 26.100 | −0.158 |
| −0.065 | 26.100 | −0.231 |
| −0.102 | 26.100 | −0.304 |
| −0.138 | 26.100 | −0.377 |
| −0.174 | 26.100 | −0.451 |
| −0.208 | 26.100 | −0.525 |
| −0.241 | 26.100 | −0.600 |
| −0.274 | 26.100 | −0.675 |
| −0.305 | 26.100 | −0.751 |
| −0.335 | 26.100 | −0.827 |
| −0.364 | 26.100 | −0.904 |
| −0.393 | 26.100 | −0.980 |

TABLE 1-continued

| X | Y | Z |
|---|---|---|
| −0.420 | 26.100 | −1.057 |
| −0.447 | 26.100 | −1.135 |
| −0.474 | 26.100 | −1.212 |
| −0.500 | 26.100 | −1.290 |
| −0.525 | 26.100 | −1.368 |
| −0.549 | 26.100 | −1.446 |
| −0.573 | 26.100 | −1.525 |
| −0.594 | 26.100 | −1.604 |
| −0.613 | 26.100 | −1.683 |
| −0.631 | 26.100 | −1.763 |
| −0.648 | 26.100 | −1.843 |
| −0.667 | 26.100 | −1.923 |
| 1.170 | 26.100 | 1.601 |
| 1.172 | 26.100 | 1.606 |
| 1.173 | 26.100 | 1.611 |
| 1.173 | 26.100 | 1.616 |
| 1.171 | 26.100 | 1.621 |
| 1.167 | 26.100 | 1.625 |
| 1.162 | 26.100 | 1.627 |
| 1.157 | 26.100 | 1.627 |
| 1.152 | 26.100 | 1.626 |
| 1.147 | 26.100 | 1.624 |
| 1.145 | 26.100 | 1.623 |
| 1.074 | 26.100 | 1.578 |
| 1.007 | 26.100 | 1.528 |
| 0.942 | 26.100 | 1.475 |
| 0.878 | 26.100 | 1.420 |
| 0.816 | 26.100 | 1.364 |
| 0.755 | 26.100 | 1.307 |
| 0.695 | 26.100 | 1.248 |
| 0.636 | 26.100 | 1.188 |
| 0.579 | 26.100 | 1.127 |
| 0.522 | 26.100 | 1.065 |
| 0.467 | 26.100 | 1.001 |
| 0.413 | 26.100 | 0.937 |
| 0.361 | 26.100 | 0.872 |
| 0.309 | 26.100 | 0.806 |
| 0.259 | 26.100 | 0.738 |
| 0.210 | 26.100 | 0.670 |
| 0.162 | 26.100 | 0.602 |
| 0.115 | 26.100 | 0.532 |
| 0.069 | 26.100 | 0.461 |
| 0.025 | 26.100 | 0.390 |
| −0.017 | 26.100 | 0.318 |
| −0.059 | 26.100 | 0.245 |
| −0.099 | 26.100 | 0.171 |
| −0.137 | 26.100 | 0.097 |
| −0.175 | 26.100 | 0.021 |
| −0.211 | 26.100 | −0.054 |
| −0.245 | 26.100 | −0.131 |
| −0.278 | 26.100 | −0.208 |
| −0.310 | 26.100 | −0.285 |
| −0.341 | 26.100 | −0.364 |
| −0.370 | 26.100 | −0.442 |
| −0.398 | 26.100 | −0.522 |
| −0.424 | 26.100 | −0.601 |
| −0.449 | 26.100 | −0.681 |
| −0.473 | 26.100 | −0.762 |
| −0.496 | 26.100 | −0.842 |
| −0.517 | 26.100 | −0.924 |
| −0.538 | 26.100 | −1.005 |
| −0.557 | 26.100 | −1.086 |
| −0.576 | 26.100 | −1.168 |
| −0.593 | 26.100 | −1.251 |
| −0.608 | 26.100 | −1.333 |
| −0.622 | 26.100 | −1.416 |
| −0.636 | 26.100 | −1.498 |
| −0.650 | 26.100 | −1.581 |
| −0.663 | 26.100 | −1.664 |
| −0.676 | 26.100 | −1.747 |
| −0.686 | 26.100 | −1.830 |
| −0.695 | 26.100 | −1.914 |
| −0.695 | 26.100 | −1.920 |
| −0.695 | 26.100 | −1.925 |
| −0.694 | 26.100 | −1.930 |
| −0.692 | 26.100 | −1.933 |
| −0.688 | 26.100 | −1.936 |
| −0.684 | 26.100 | −1.938 |
| −0.679 | 26.100 | −1.938 |
| −0.675 | 26.100 | −1.937 |
| −0.671 | 26.100 | −1.934 |
| −0.669 | 26.100 | −1.930 |
| −0.667 | 26.100 | −1.926 |
| 1.202 | 27.700 | 1.696 |
| 1.159 | 27.700 | 1.623 |
| 1.110 | 27.700 | 1.554 |
| 1.059 | 27.700 | 1.486 |
| 1.007 | 27.700 | 1.418 |
| 0.957 | 27.700 | 1.350 |
| 0.906 | 27.700 | 1.282 |
| 0.856 | 27.700 | 1.213 |
| 0.806 | 27.700 | 1.145 |
| 0.757 | 27.700 | 1.075 |
| 0.708 | 27.700 | 1.006 |
| 0.660 | 27.700 | 0.936 |
| 0.612 | 27.700 | 0.866 |
| 0.565 | 27.700 | 0.795 |
| 0.519 | 27.700 | 0.724 |
| 0.473 | 27.700 | 0.652 |
| 0.428 | 27.700 | 0.580 |
| 0.383 | 27.700 | 0.508 |
| 0.339 | 27.700 | 0.436 |
| 0.296 | 27.700 | 0.363 |
| 0.253 | 27.700 | 0.289 |
| 0.210 | 27.700 | 0.216 |
| 0.169 | 27.700 | 0.142 |
| 0.127 | 27.700 | 0.068 |
| 0.087 | 27.700 | −0.007 |
| 0.046 | 27.700 | −0.082 |
| 0.007 | 27.700 | −0.157 |
| −0.032 | 27.700 | −0.232 |
| −0.071 | 27.700 | −0.308 |
| −0.108 | 27.700 | −0.384 |
| −0.145 | 27.700 | −0.461 |
| −0.182 | 27.700 | −0.537 |
| −0.217 | 27.700 | −0.614 |
| −0.252 | 27.700 | −0.692 |
| −0.285 | 27.700 | −0.770 |
| −0.318 | 27.700 | −0.848 |
| −0.350 | 27.700 | −0.927 |
| −0.381 | 27.700 | −1.006 |
| −0.411 | 27.700 | −1.086 |
| −0.440 | 27.700 | −1.165 |
| −0.469 | 27.700 | −1.245 |
| −0.496 | 27.700 | −1.326 |
| −0.523 | 27.700 | −1.406 |
| −0.548 | 27.700 | −1.487 |
| −0.572 | 27.700 | −1.569 |
| −0.595 | 27.700 | −1.651 |
| −0.616 | 27.700 | −1.733 |
| −0.636 | 27.700 | −1.815 |
| −0.656 | 27.700 | −1.898 |
| −0.676 | 27.700 | −1.980 |
| 1.203 | 27.700 | 1.699 |
| 1.206 | 27.700 | 1.706 |
| 1.208 | 27.700 | 1.713 |
| 1.209 | 27.700 | 1.721 |
| 1.207 | 27.700 | 1.728 |
| 1.202 | 27.700 | 1.733 |
| 1.195 | 27.700 | 1.734 |
| 1.188 | 27.700 | 1.733 |
| 1.181 | 27.700 | 1.731 |
| 1.174 | 27.700 | 1.728 |
| 1.171 | 27.700 | 1.726 |
| 1.098 | 27.700 | 1.679 |
| 1.028 | 27.700 | 1.626 |
| 0.961 | 27.700 | 1.570 |
| 0.896 | 27.700 | 1.512 |
| 0.832 | 27.700 | 1.453 |
| 0.769 | 27.700 | 1.392 |
| 0.708 | 27.700 | 1.330 |
| 0.649 | 27.700 | 1.267 |
| 0.590 | 27.700 | 1.202 |
| 0.533 | 27.700 | 1.136 |
| 0.477 | 27.700 | 1.069 |
| 0.422 | 27.700 | 1.002 |

TABLE 1-continued

| X | Y | Z |
|---|---|---|
| 0.368 | 27.700 | 0.933 |
| 0.316 | 27.700 | 0.863 |
| 0.264 | 27.700 | 0.793 |
| 0.214 | 27.700 | 0.721 |
| 0.165 | 27.700 | 0.649 |
| 0.118 | 27.700 | 0.576 |
| 0.071 | 27.700 | 0.502 |
| 0.026 | 27.700 | 0.427 |
| −0.017 | 27.700 | 0.352 |
| −0.059 | 27.700 | 0.275 |
| −0.100 | 27.700 | 0.198 |
| −0.139 | 27.700 | 0.120 |
| −0.177 | 27.700 | 0.042 |
| −0.214 | 27.700 | −0.038 |
| −0.249 | 27.700 | −0.117 |
| −0.282 | 27.700 | −0.198 |
| −0.315 | 27.700 | −0.279 |
| −0.346 | 27.700 | −0.361 |
| −0.375 | 27.700 | −0.443 |
| −0.403 | 27.700 | −0.525 |
| −0.430 | 27.700 | −0.608 |
| −0.456 | 27.700 | −0.691 |
| −0.480 | 27.700 | −0.775 |
| −0.504 | 27.700 | −0.859 |
| −0.526 | 27.700 | −0.944 |
| −0.547 | 27.700 | −1.028 |
| −0.566 | 27.700 | −1.113 |
| −0.585 | 27.700 | −1.199 |
| −0.603 | 27.700 | −1.284 |
| −0.619 | 27.700 | −1.370 |
| −0.635 | 27.700 | −1.455 |
| −0.650 | 27.700 | −1.541 |
| −0.664 | 27.700 | −1.627 |
| −0.678 | 27.700 | −1.714 |
| −0.691 | 27.700 | −1.800 |
| −0.702 | 27.700 | −1.886 |
| −0.710 | 27.700 | −1.973 |
| −0.711 | 27.700 | −1.976 |
| −0.711 | 27.700 | −1.982 |
| −0.710 | 27.700 | −1.987 |
| −0.707 | 27.700 | −1.992 |
| −0.703 | 27.700 | −1.996 |
| −0.698 | 27.700 | −1.998 |
| −0.692 | 27.700 | −1.998 |
| −0.687 | 27.700 | −1.996 |
| −0.682 | 27.700 | −1.993 |
| −0.679 | 27.700 | −1.989 |
| −0.677 | 27.700 | −1.983 |
| 1.231 | 29.300 | 1.790 |
| 1.189 | 29.300 | 1.713 |
| 1.141 | 29.300 | 1.639 |
| 1.091 | 29.300 | 1.567 |
| 1.041 | 29.300 | 1.495 |
| 0.990 | 29.300 | 1.423 |
| 0.940 | 29.300 | 1.351 |
| 0.890 | 29.300 | 1.279 |
| 0.841 | 29.300 | 1.206 |
| 0.792 | 29.300 | 1.133 |
| 0.744 | 29.300 | 1.060 |
| 0.696 | 29.300 | 0.986 |
| 0.649 | 29.300 | 0.912 |
| 0.603 | 29.300 | 0.838 |
| 0.556 | 29.300 | 0.763 |
| 0.511 | 29.300 | 0.688 |
| 0.465 | 29.300 | 0.613 |
| 0.420 | 29.300 | 0.538 |
| 0.376 | 29.300 | 0.462 |
| 0.332 | 29.300 | 0.386 |
| 0.289 | 29.300 | 0.309 |
| 0.246 | 29.300 | 0.233 |
| 0.203 | 29.300 | 0.156 |
| 0.161 | 29.300 | 0.079 |
| 0.120 | 29.300 | 0.001 |
| 0.079 | 29.300 | −0.076 |
| 0.039 | 29.300 | −0.154 |
| −0.001 | 29.300 | −0.232 |
| −0.041 | 29.300 | −0.311 |
| −0.080 | 29.300 | −0.390 |
| −0.118 | 29.300 | −0.469 |
| −0.156 | 29.300 | −0.548 |
| −0.193 | 29.300 | −0.627 |
| −0.230 | 29.300 | −0.707 |
| −0.266 | 29.300 | −0.787 |
| −0.301 | 29.300 | −0.868 |
| −0.335 | 29.300 | −0.948 |
| −0.369 | 29.300 | −1.030 |
| −0.401 | 29.300 | −1.111 |
| −0.433 | 29.300 | −1.193 |
| −0.463 | 29.300 | −1.275 |
| −0.493 | 29.300 | −1.358 |
| −0.520 | 29.300 | −1.442 |
| −0.547 | 29.300 | −1.525 |
| −0.572 | 29.300 | −1.609 |
| −0.596 | 29.300 | −1.694 |
| −0.620 | 29.300 | −1.778 |
| −0.642 | 29.300 | −1.863 |
| −0.664 | 29.300 | −1.948 |
| −0.686 | 29.300 | −2.033 |
| 1.233 | 29.300 | 1.794 |
| 1.237 | 29.300 | 1.802 |
| 1.239 | 29.300 | 1.811 |
| 1.239 | 29.300 | 1.820 |
| 1.237 | 29.300 | 1.829 |
| 1.230 | 29.300 | 1.835 |
| 1.222 | 29.300 | 1.837 |
| 1.213 | 29.300 | 1.836 |
| 1.204 | 29.300 | 1.834 |
| 1.196 | 29.300 | 1.830 |
| 1.192 | 29.300 | 1.828 |
| 1.115 | 29.300 | 1.779 |
| 1.044 | 29.300 | 1.724 |
| 0.975 | 29.300 | 1.665 |
| 0.908 | 29.300 | 1.604 |
| 0.842 | 29.300 | 1.542 |
| 0.779 | 29.300 | 1.478 |
| 0.717 | 29.300 | 1.412 |
| 0.656 | 29.300 | 1.345 |
| 0.597 | 29.300 | 1.276 |
| 0.539 | 29.300 | 1.207 |
| 0.482 | 29.300 | 1.137 |
| 0.426 | 29.300 | 1.066 |
| 0.371 | 29.300 | 0.993 |
| 0.318 | 29.300 | 0.920 |
| 0.265 | 29.300 | 0.847 |
| 0.214 | 29.300 | 0.772 |
| 0.165 | 29.300 | 0.696 |
| 0.116 | 29.300 | 0.620 |
| 0.069 | 29.300 | 0.543 |
| 0.024 | 29.300 | 0.465 |
| −0.021 | 29.300 | 0.386 |
| −0.063 | 29.300 | 0.306 |
| −0.105 | 29.300 | 0.225 |
| −0.145 | 29.300 | 0.144 |
| −0.183 | 29.300 | 0.062 |
| −0.220 | 29.300 | −0.020 |
| −0.255 | 29.300 | −0.104 |
| −0.289 | 29.300 | −0.187 |
| −0.322 | 29.300 | −0.272 |
| −0.353 | 29.300 | −0.357 |
| −0.383 | 29.300 | −0.442 |
| −0.412 | 29.300 | −0.528 |
| −0.439 | 29.300 | −0.614 |
| −0.465 | 29.300 | −0.701 |
| −0.490 | 29.300 | −0.788 |
| −0.513 | 29.300 | −0.875 |
| −0.535 | 29.300 | −0.963 |
| −0.556 | 29.300 | −1.051 |
| −0.576 | 29.300 | −1.139 |
| −0.595 | 29.300 | −1.228 |
| −0.613 | 29.300 | −1.316 |
| −0.630 | 29.300 | −1.405 |
| −0.647 | 29.300 | −1.494 |
| −0.662 | 29.300 | −1.583 |
| −0.678 | 29.300 | −1.672 |
| −0.692 | 29.300 | −1.762 |
| −0.705 | 29.300 | −1.851 |

TABLE 1-continued

| X | Y | Z |
|---|---|---|
| −0.717 | 29.300 | −1.941 |
| −0.725 | 29.300 | −2.029 |
| −0.726 | 29.300 | −2.033 |
| −0.725 | 29.300 | −2.039 |
| −0.723 | 29.300 | −2.045 |
| −0.719 | 29.300 | −2.050 |
| −0.713 | 29.300 | −2.054 |
| −0.707 | 29.300 | −2.055 |
| −0.701 | 29.300 | −2.054 |
| −0.695 | 29.300 | −2.051 |
| −0.690 | 29.300 | −2.047 |
| −0.688 | 29.300 | −2.041 |
| 1.265 | 30.900 | 1.881 |
| 1.223 | 30.900 | 1.800 |
| 1.176 | 30.900 | 1.722 |
| 1.127 | 30.900 | 1.646 |
| 1.077 | 30.900 | 1.570 |
| 1.027 | 30.900 | 1.494 |
| 0.977 | 30.900 | 1.418 |
| 0.928 | 30.900 | 1.342 |
| 0.879 | 30.900 | 1.266 |
| 0.830 | 30.900 | 1.189 |
| 0.782 | 30.900 | 1.113 |
| 0.734 | 30.900 | 1.035 |
| 0.686 | 30.900 | 0.958 |
| 0.639 | 30.900 | 0.881 |
| 0.592 | 30.900 | 0.803 |
| 0.546 | 30.900 | 0.725 |
| 0.500 | 30.900 | 0.646 |
| 0.455 | 30.900 | 0.568 |
| 0.410 | 30.900 | 0.489 |
| 0.365 | 30.900 | 0.410 |
| 0.321 | 30.900 | 0.330 |
| 0.277 | 30.900 | 0.251 |
| 0.234 | 30.900 | 0.171 |
| 0.191 | 30.900 | 0.091 |
| 0.149 | 30.900 | 0.011 |
| 0.107 | 30.900 | −0.070 |
| 0.065 | 30.900 | −0.151 |
| 0.024 | 30.900 | −0.232 |
| −0.017 | 30.900 | −0.313 |
| −0.057 | 30.900 | −0.394 |
| −0.097 | 30.900 | −0.476 |
| −0.136 | 30.900 | −0.558 |
| −0.175 | 30.900 | −0.640 |
| −0.213 | 30.900 | −0.722 |
| −0.250 | 30.900 | −0.805 |
| −0.287 | 30.900 | −0.888 |
| −0.324 | 30.900 | −0.971 |
| −0.359 | 30.900 | −1.054 |
| −0.394 | 30.900 | −1.138 |
| −0.427 | 30.900 | −1.223 |
| −0.460 | 30.900 | −1.308 |
| −0.491 | 30.900 | −1.393 |
| −0.521 | 30.900 | −1.479 |
| −0.549 | 30.900 | −1.565 |
| −0.576 | 30.900 | −1.652 |
| −0.601 | 30.900 | −1.739 |
| −0.626 | 30.900 | −1.826 |
| −0.650 | 30.900 | −1.914 |
| −0.674 | 30.900 | −2.001 |
| −0.697 | 30.900 | −2.089 |
| 1.267 | 30.900 | 1.886 |
| 1.271 | 30.900 | 1.896 |
| 1.274 | 30.900 | 1.907 |
| 1.274 | 30.900 | 1.919 |
| 1.270 | 30.900 | 1.930 |
| 1.262 | 30.900 | 1.937 |
| 1.251 | 30.900 | 1.939 |
| 1.240 | 30.900 | 1.937 |
| 1.229 | 30.900 | 1.934 |
| 1.219 | 30.900 | 1.929 |
| 1.214 | 30.900 | 1.926 |
| 1.135 | 30.900 | 1.876 |
| 1.061 | 30.900 | 1.819 |
| 0.990 | 30.900 | 1.758 |
| 0.921 | 30.900 | 1.694 |
| 0.854 | 30.900 | 1.629 |
| 0.789 | 30.900 | 1.562 |
| 0.726 | 30.900 | 1.493 |
| 0.664 | 30.900 | 1.423 |
| 0.603 | 30.900 | 1.351 |
| 0.544 | 30.900 | 1.279 |
| 0.485 | 30.900 | 1.206 |
| 0.428 | 30.900 | 1.131 |
| 0.372 | 30.900 | 1.056 |
| 0.318 | 30.900 | 0.980 |
| 0.264 | 30.900 | 0.903 |
| 0.212 | 30.900 | 0.826 |
| 0.161 | 30.900 | 0.747 |
| 0.112 | 30.900 | 0.667 |
| 0.064 | 30.900 | 0.587 |
| 0.018 | 30.900 | 0.506 |
| −0.027 | 30.900 | 0.423 |
| −0.071 | 30.900 | 0.341 |
| −0.113 | 30.900 | 0.257 |
| −0.153 | 30.900 | 0.173 |
| −0.192 | 30.900 | 0.087 |
| −0.230 | 30.900 | 0.002 |
| −0.266 | 30.900 | −0.085 |
| −0.300 | 30.900 | −0.172 |
| −0.333 | 30.900 | −0.259 |
| −0.365 | 30.900 | −0.348 |
| −0.395 | 30.900 | −0.436 |
| −0.424 | 30.900 | −0.525 |
| −0.451 | 30.900 | −0.615 |
| −0.477 | 30.900 | −0.705 |
| −0.502 | 30.900 | −0.795 |
| −0.525 | 30.900 | −0.886 |
| −0.548 | 30.900 | −0.977 |
| −0.569 | 30.900 | −1.068 |
| −0.589 | 30.900 | −1.159 |
| −0.608 | 30.900 | −1.251 |
| −0.626 | 30.900 | −1.343 |
| −0.643 | 30.900 | −1.435 |
| −0.659 | 30.900 | −1.527 |
| −0.675 | 30.900 | −1.619 |
| −0.691 | 30.900 | −1.712 |
| −0.705 | 30.900 | −1.804 |
| −0.719 | 30.900 | −1.897 |
| −0.731 | 30.900 | −1.990 |
| −0.740 | 30.900 | −2.083 |
| −0.741 | 30.900 | −2.090 |
| −0.739 | 30.900 | −2.097 |
| −0.734 | 30.900 | −2.103 |
| −0.729 | 30.900 | −2.107 |
| −0.722 | 30.900 | −2.109 |
| −0.715 | 30.900 | −2.109 |
| −0.708 | 30.900 | −2.107 |
| −0.703 | 30.900 | −2.102 |
| −0.699 | 30.900 | −2.096 |
| 1.300 | 32.500 | 1.970 |
| 1.260 | 32.500 | 1.886 |
| 1.214 | 32.500 | 1.804 |
| 1.165 | 32.500 | 1.724 |
| 1.116 | 32.500 | 1.644 |
| 1.066 | 32.500 | 1.564 |
| 1.016 | 32.500 | 1.485 |
| 0.966 | 32.500 | 1.405 |
| 0.916 | 32.500 | 1.326 |
| 0.867 | 32.500 | 1.246 |
| 0.818 | 32.500 | 1.166 |
| 0.769 | 32.500 | 1.085 |
| 0.721 | 32.500 | 1.005 |
| 0.673 | 32.500 | 0.924 |
| 0.626 | 32.500 | 0.843 |
| 0.578 | 32.500 | 0.762 |
| 0.532 | 32.500 | 0.681 |
| 0.485 | 32.500 | 0.599 |
| 0.439 | 32.500 | 0.517 |
| 0.394 | 32.500 | 0.435 |
| 0.349 | 32.500 | 0.353 |
| 0.304 | 32.500 | 0.270 |
| 0.260 | 32.500 | 0.187 |
| 0.216 | 32.500 | 0.104 |
| 0.172 | 32.500 | 0.021 |

TABLE 1-continued

| X | Y | Z |
|---|---|---|
| 0.129 | 32.500 | −0.062 |
| 0.086 | 32.500 | −0.146 |
| 0.044 | 32.500 | −0.230 |
| 0.002 | 32.500 | −0.313 |
| −0.040 | 32.500 | −0.398 |
| −0.081 | 32.500 | −0.482 |
| −0.122 | 32.500 | −0.567 |
| −0.162 | 32.500 | −0.652 |
| −0.201 | 32.500 | −0.737 |
| −0.240 | 32.500 | −0.822 |
| −0.279 | 32.500 | −0.908 |
| −0.316 | 32.500 | −0.994 |
| −0.353 | 32.500 | −1.080 |
| −0.390 | 32.500 | −1.167 |
| −0.425 | 32.500 | −1.254 |
| −0.459 | 32.500 | −1.341 |
| −0.492 | 32.500 | −1.429 |
| −0.524 | 32.500 | −1.517 |
| −0.554 | 32.500 | −1.606 |
| −0.583 | 32.500 | −1.696 |
| −0.610 | 32.500 | −1.785 |
| −0.637 | 32.500 | −1.876 |
| −0.662 | 32.500 | −1.966 |
| −0.687 | 32.500 | −2.057 |
| −0.709 | 32.500 | −2.140 |
| 1.305 | 32.500 | 1.983 |
| 1.309 | 32.500 | 1.996 |
| 1.311 | 32.500 | 2.010 |
| 1.311 | 32.500 | 2.023 |
| 1.304 | 32.500 | 2.035 |
| 1.291 | 32.500 | 2.040 |
| 1.278 | 32.500 | 2.039 |
| 1.265 | 32.500 | 2.036 |
| 1.252 | 32.500 | 2.030 |
| 1.240 | 32.500 | 2.024 |
| 1.159 | 32.500 | 1.971 |
| 1.082 | 32.500 | 1.913 |
| 1.008 | 32.500 | 1.850 |
| 0.937 | 32.500 | 1.784 |
| 0.868 | 32.500 | 1.716 |
| 0.801 | 32.500 | 1.646 |
| 0.736 | 32.500 | 1.575 |
| 0.671 | 32.500 | 1.502 |
| 0.609 | 32.500 | 1.429 |
| 0.547 | 32.500 | 1.354 |
| 0.487 | 32.500 | 1.278 |
| 0.428 | 32.500 | 1.201 |
| 0.371 | 32.500 | 1.123 |
| 0.315 | 32.500 | 1.044 |
| 0.260 | 32.500 | 0.964 |
| 0.206 | 32.500 | 0.884 |
| 0.154 | 32.500 | 0.802 |
| 0.104 | 32.500 | 0.719 |
| 0.055 | 32.500 | 0.636 |
| 0.007 | 32.500 | 0.551 |
| −0.039 | 32.500 | 0.466 |
| −0.083 | 32.500 | 0.380 |
| −0.126 | 32.500 | 0.293 |
| −0.168 | 32.500 | 0.206 |
| −0.208 | 32.500 | 0.118 |
| −0.246 | 32.500 | 0.029 |
| −0.282 | 32.500 | −0.061 |
| −0.317 | 32.500 | −0.151 |
| −0.351 | 32.500 | −0.242 |
| −0.382 | 32.500 | −0.334 |
| −0.413 | 32.500 | −0.426 |
| −0.441 | 32.500 | −0.518 |
| −0.469 | 32.500 | −0.611 |
| −0.495 | 32.500 | −0.704 |
| −0.519 | 32.500 | −0.798 |
| −0.543 | 32.500 | −0.892 |
| −0.565 | 32.500 | −0.986 |
| −0.586 | 32.500 | −1.081 |
| −0.606 | 32.500 | −1.175 |
| −0.625 | 32.500 | −1.270 |
| −0.643 | 32.500 | −1.366 |
| −0.660 | 32.500 | −1.461 |
| −0.676 | 32.500 | −1.556 |
| −0.692 | 32.500 | −1.652 |
| −0.707 | 32.500 | −1.748 |
| −0.721 | 32.500 | −1.843 |
| −0.734 | 32.500 | −1.939 |
| −0.746 | 32.500 | −2.035 |
| −0.757 | 32.500 | −2.132 |
| −0.757 | 32.500 | −2.140 |
| −0.754 | 32.500 | −2.147 |
| −0.750 | 32.500 | −2.153 |
| −0.744 | 32.500 | −2.158 |
| −0.737 | 32.500 | −2.160 |
| −0.729 | 32.500 | −2.160 |
| −0.722 | 32.500 | −2.158 |
| −0.716 | 32.500 | −2.153 |
| −0.711 | 32.500 | −2.147 |
| 1.335 | 34.100 | 2.057 |
| 1.295 | 34.100 | 1.969 |
| 1.249 | 34.100 | 1.884 |
| 1.201 | 34.100 | 1.800 |
| 1.152 | 34.100 | 1.717 |
| 1.102 | 34.100 | 1.635 |
| 1.051 | 34.100 | 1.552 |
| 1.001 | 34.100 | 1.470 |
| 0.951 | 34.100 | 1.387 |
| 0.901 | 34.100 | 1.304 |
| 0.852 | 34.100 | 1.221 |
| 0.803 | 34.100 | 1.138 |
| 0.754 | 34.100 | 1.055 |
| 0.705 | 34.100 | 0.972 |
| 0.657 | 34.100 | 0.888 |
| 0.609 | 34.100 | 0.804 |
| 0.562 | 34.100 | 0.720 |
| 0.515 | 34.100 | 0.636 |
| 0.468 | 34.100 | 0.551 |
| 0.421 | 34.100 | 0.466 |
| 0.375 | 34.100 | 0.381 |
| 0.330 | 34.100 | 0.296 |
| 0.284 | 34.100 | 0.211 |
| 0.239 | 34.100 | 0.126 |
| 0.195 | 34.100 | 0.040 |
| 0.150 | 34.100 | −0.046 |
| 0.106 | 34.100 | −0.132 |
| 0.063 | 34.100 | −0.218 |
| 0.019 | 34.100 | −0.304 |
| −0.023 | 34.100 | −0.391 |
| −0.066 | 34.100 | −0.478 |
| −0.108 | 34.100 | −0.565 |
| −0.149 | 34.100 | −0.652 |
| −0.190 | 34.100 | −0.739 |
| −0.230 | 34.100 | −0.827 |
| −0.270 | 34.100 | −0.915 |
| −0.309 | 34.100 | −1.003 |
| −0.347 | 34.100 | −1.092 |
| −0.385 | 34.100 | −1.181 |
| −0.422 | 34.100 | −1.270 |
| −0.457 | 34.100 | −1.360 |
| −0.492 | 34.100 | −1.450 |
| −0.525 | 34.100 | −1.541 |
| −0.557 | 34.100 | −1.632 |
| −0.587 | 34.100 | −1.724 |
| −0.616 | 34.100 | −1.816 |
| −0.644 | 34.100 | −1.909 |
| −0.670 | 34.100 | −2.002 |
| −0.695 | 34.100 | −2.095 |
| −0.719 | 34.100 | −2.187 |
| 1.340 | 34.100 | 2.072 |
| 1.344 | 34.100 | 2.088 |
| 1.347 | 34.100 | 2.104 |
| 1.346 | 34.100 | 2.120 |
| 1.338 | 34.100 | 2.134 |
| 1.324 | 34.100 | 2.139 |
| 1.307 | 34.100 | 2.138 |
| 1.292 | 34.100 | 2.133 |
| 1.277 | 34.100 | 2.127 |
| 1.263 | 34.100 | 2.119 |
| 1.179 | 34.100 | 2.065 |
| 1.099 | 34.100 | 2.005 |
| 1.023 | 34.100 | 1.940 |

TABLE 1-continued

| X | Y | Z |
|---|---|---|
| 0.950 | 34.100 | 1.872 |
| 0.879 | 34.100 | 1.802 |
| 0.809 | 34.100 | 1.730 |
| 0.742 | 34.100 | 1.657 |
| 0.675 | 34.100 | 1.582 |
| 0.610 | 34.100 | 1.506 |
| 0.547 | 34.100 | 1.429 |
| 0.485 | 34.100 | 1.351 |
| 0.424 | 34.100 | 1.271 |
| 0.365 | 34.100 | 1.191 |
| 0.307 | 34.100 | 1.110 |
| 0.251 | 34.100 | 1.027 |
| 0.196 | 34.100 | 0.944 |
| 0.142 | 34.100 | 0.859 |
| 0.091 | 34.100 | 0.774 |
| 0.040 | 34.100 | 0.688 |
| −0.009 | 34.100 | 0.601 |
| −0.056 | 34.100 | 0.513 |
| −0.102 | 34.100 | 0.424 |
| −0.146 | 34.100 | 0.334 |
| −0.188 | 34.100 | 0.244 |
| −0.228 | 34.100 | 0.152 |
| −0.267 | 34.100 | 0.060 |
| −0.304 | 34.100 | −0.032 |
| −0.339 | 34.100 | −0.126 |
| −0.373 | 34.100 | −0.220 |
| −0.405 | 34.100 | −0.315 |
| −0.435 | 34.100 | −0.410 |
| −0.464 | 34.100 | −0.505 |
| −0.491 | 34.100 | −0.602 |
| −0.517 | 34.100 | −0.698 |
| −0.541 | 34.100 | −0.795 |
| −0.564 | 34.100 | −0.892 |
| −0.586 | 34.100 | −0.989 |
| −0.607 | 34.100 | −1.087 |
| −0.626 | 34.100 | −1.185 |
| −0.645 | 34.100 | −1.283 |
| −0.662 | 34.100 | −1.382 |
| −0.679 | 34.100 | −1.480 |
| −0.694 | 34.100 | −1.579 |
| −0.709 | 34.100 | −1.678 |
| −0.724 | 34.100 | −1.776 |
| −0.737 | 34.100 | −1.875 |
| −0.750 | 34.100 | −1.974 |
| −0.762 | 34.100 | −2.074 |
| −0.773 | 34.100 | −2.173 |
| −0.773 | 34.100 | −2.183 |
| −0.771 | 34.100 | −2.192 |
| −0.767 | 34.100 | −2.199 |
| −0.760 | 34.100 | −2.205 |
| −0.752 | 34.100 | −2.208 |
| −0.744 | 34.100 | −2.209 |
| −0.735 | 34.100 | −2.206 |
| −0.728 | 34.100 | −2.202 |
| −0.722 | 34.100 | −2.195 |
| 1.366 | 35.700 | 2.137 |
| 1.326 | 35.700 | 2.047 |
| 1.280 | 35.700 | 1.959 |
| 1.231 | 35.700 | 1.873 |
| 1.180 | 35.700 | 1.787 |
| 1.130 | 35.700 | 1.702 |
| 1.079 | 35.700 | 1.617 |
| 1.028 | 35.700 | 1.532 |
| 0.978 | 35.700 | 1.446 |
| 0.928 | 35.700 | 1.360 |
| 0.878 | 35.700 | 1.275 |
| 0.829 | 35.700 | 1.189 |
| 0.779 | 35.700 | 1.103 |
| 0.730 | 35.700 | 1.017 |
| 0.682 | 35.700 | 0.930 |
| 0.633 | 35.700 | 0.844 |
| 0.585 | 35.700 | 0.757 |
| 0.538 | 35.700 | 0.670 |
| 0.490 | 35.700 | 0.583 |
| 0.443 | 35.700 | 0.496 |
| 0.396 | 35.700 | 0.408 |
| 0.350 | 35.700 | 0.321 |
| 0.303 | 35.700 | 0.233 |
| 0.257 | 35.700 | 0.145 |
| 0.212 | 35.700 | 0.057 |
| 0.166 | 35.700 | −0.031 |
| 0.121 | 35.700 | −0.119 |
| 0.076 | 35.700 | −0.207 |
| 0.031 | 35.700 | −0.296 |
| −0.013 | 35.700 | −0.384 |
| −0.057 | 35.700 | −0.473 |
| −0.101 | 35.700 | −0.562 |
| −0.143 | 35.700 | −0.652 |
| −0.186 | 35.700 | −0.741 |
| −0.227 | 35.700 | −0.831 |
| −0.268 | 35.700 | −0.922 |
| −0.308 | 35.700 | −1.012 |
| −0.348 | 35.700 | −1.104 |
| −0.386 | 35.700 | −1.195 |
| −0.423 | 35.700 | −1.287 |
| −0.459 | 35.700 | −1.379 |
| −0.494 | 35.700 | −1.472 |
| −0.528 | 35.700 | −1.565 |
| −0.561 | 35.700 | −1.659 |
| −0.592 | 35.700 | −1.753 |
| −0.621 | 35.700 | −1.848 |
| −0.648 | 35.700 | −1.943 |
| −0.674 | 35.700 | −2.039 |
| −0.699 | 35.700 | −2.135 |
| −0.723 | 35.700 | −2.229 |
| 1.373 | 35.700 | 2.155 |
| 1.378 | 35.700 | 2.174 |
| 1.380 | 35.700 | 2.193 |
| 1.378 | 35.700 | 2.211 |
| 1.368 | 35.700 | 2.227 |
| 1.350 | 35.700 | 2.234 |
| 1.331 | 35.700 | 2.233 |
| 1.313 | 35.700 | 2.227 |
| 1.295 | 35.700 | 2.220 |
| 1.278 | 35.700 | 2.210 |
| 1.192 | 35.700 | 2.155 |
| 1.110 | 35.700 | 2.093 |
| 1.031 | 35.700 | 2.026 |
| 0.955 | 35.700 | 1.957 |
| 0.882 | 35.700 | 1.885 |
| 0.810 | 35.700 | 1.811 |
| 0.740 | 35.700 | 1.736 |
| 0.672 | 35.700 | 1.659 |
| 0.605 | 35.700 | 1.581 |
| 0.539 | 35.700 | 1.501 |
| 0.476 | 35.700 | 1.421 |
| 0.413 | 35.700 | 1.339 |
| 0.352 | 35.700 | 1.256 |
| 0.293 | 35.700 | 1.172 |
| 0.235 | 35.700 | 1.087 |
| 0.179 | 35.700 | 1.001 |
| 0.124 | 35.700 | 0.914 |
| 0.070 | 35.700 | 0.826 |
| 0.019 | 35.700 | 0.737 |
| −0.032 | 35.700 | 0.647 |
| −0.080 | 35.700 | 0.557 |
| −0.127 | 35.700 | 0.465 |
| −0.171 | 35.700 | 0.372 |
| −0.214 | 35.700 | 0.279 |
| −0.255 | 35.700 | 0.185 |
| −0.294 | 35.700 | 0.089 |
| −0.331 | 35.700 | −0.007 |
| −0.367 | 35.700 | −0.103 |
| −0.400 | 35.700 | −0.200 |
| −0.432 | 35.700 | −0.298 |
| −0.463 | 35.700 | −0.396 |
| −0.491 | 35.700 | −0.495 |
| −0.518 | 35.700 | −0.595 |
| −0.544 | 35.700 | −0.694 |
| −0.568 | 35.700 | −0.794 |
| −0.590 | 35.700 | −0.895 |
| −0.611 | 35.700 | −0.995 |
| −0.630 | 35.700 | −1.096 |
| −0.649 | 35.700 | −1.198 |
| −0.666 | 35.700 | −1.299 |
| −0.682 | 35.700 | −1.401 |

TABLE 1-continued

| X | Y | Z |
| --- | --- | --- |
| −0.698 | 35.700 | −1.502 |
| −0.712 | 35.700 | −1.604 |
| −0.726 | 35.700 | −1.706 |
| −0.739 | 35.700 | −1.808 |
| −0.751 | 35.700 | −1.910 |
| −0.763 | 35.700 | −2.012 |
| −0.774 | 35.700 | −2.115 |
| −0.784 | 35.700 | −2.217 |
| −0.784 | 35.700 | −2.227 |
| −0.782 | 35.700 | −2.237 |
| −0.777 | 35.700 | −2.245 |
| −0.769 | 35.700 | −2.251 |
| −0.760 | 35.700 | −2.255 |
| −0.750 | 35.700 | −2.255 |
| −0.740 | 35.700 | −2.252 |
| −0.732 | 35.700 | −2.246 |
| −0.726 | 35.700 | −2.238 |
| 1.394 | 37.300 | 2.214 |
| 1.353 | 37.300 | 2.122 |
| 1.304 | 37.300 | 2.032 |
| 1.254 | 37.300 | 1.944 |
| 1.202 | 37.300 | 1.857 |
| 1.151 | 37.300 | 1.769 |
| 1.099 | 37.300 | 1.681 |
| 1.049 | 37.300 | 1.593 |
| 0.998 | 37.300 | 1.505 |
| 0.948 | 37.300 | 1.417 |
| 0.898 | 37.300 | 1.328 |
| 0.848 | 37.300 | 1.240 |
| 0.798 | 37.300 | 1.151 |
| 0.749 | 37.300 | 1.062 |
| 0.700 | 37.300 | 0.974 |
| 0.651 | 37.300 | 0.885 |
| 0.602 | 37.300 | 0.795 |
| 0.554 | 37.300 | 0.706 |
| 0.506 | 37.300 | 0.616 |
| 0.458 | 37.300 | 0.527 |
| 0.411 | 37.300 | 0.437 |
| 0.363 | 37.300 | 0.347 |
| 0.316 | 37.300 | 0.257 |
| 0.269 | 37.300 | 0.167 |
| 0.223 | 37.300 | 0.077 |
| 0.176 | 37.300 | −0.014 |
| 0.130 | 37.300 | −0.104 |
| 0.084 | 37.300 | −0.195 |
| 0.038 | 37.300 | −0.285 |
| −0.007 | 37.300 | −0.376 |
| −0.052 | 37.300 | −0.467 |
| −0.097 | 37.300 | −0.559 |
| −0.141 | 37.300 | −0.650 |
| −0.184 | 37.300 | −0.742 |
| −0.227 | 37.300 | −0.835 |
| −0.268 | 37.300 | −0.927 |
| −0.309 | 37.300 | −1.020 |
| −0.349 | 37.300 | −1.114 |
| −0.387 | 37.300 | −1.208 |
| −0.424 | 37.300 | −1.302 |
| −0.461 | 37.300 | −1.397 |
| −0.495 | 37.300 | −1.493 |
| −0.529 | 37.300 | −1.589 |
| −0.561 | 37.300 | −1.685 |
| −0.591 | 37.300 | −1.782 |
| −0.619 | 37.300 | −1.880 |
| −0.646 | 37.300 | −1.978 |
| −0.671 | 37.300 | −2.076 |
| −0.696 | 37.300 | −2.175 |
| −0.720 | 37.300 | −2.273 |
| 1.401 | 37.300 | 2.234 |
| 1.406 | 37.300 | 2.255 |
| 1.408 | 37.300 | 2.276 |
| 1.406 | 37.300 | 2.298 |
| 1.396 | 37.300 | 2.316 |
| 1.376 | 37.300 | 2.324 |
| 1.355 | 37.300 | 2.323 |
| 1.334 | 37.300 | 2.317 |
| 1.314 | 37.300 | 2.310 |
| 1.295 | 37.300 | 2.300 |
| 1.205 | 37.300 | 2.244 |
| 1.120 | 37.300 | 2.181 |
| 1.039 | 37.300 | 2.113 |
| 0.960 | 37.300 | 2.043 |
| 0.883 | 37.300 | 1.969 |
| 0.809 | 37.300 | 1.894 |
| 0.736 | 37.300 | 1.817 |
| 0.665 | 37.300 | 1.738 |
| 0.596 | 37.300 | 1.658 |
| 0.528 | 37.300 | 1.577 |
| 0.462 | 37.300 | 1.494 |
| 0.398 | 37.300 | 1.410 |
| 0.335 | 37.300 | 1.324 |
| 0.274 | 37.300 | 1.238 |
| 0.214 | 37.300 | 1.150 |
| 0.156 | 37.300 | 1.062 |
| 0.100 | 37.300 | 0.972 |
| 0.045 | 37.300 | 0.882 |
| −0.009 | 37.300 | 0.790 |
| −0.060 | 37.300 | 0.698 |
| −0.110 | 37.300 | 0.604 |
| −0.157 | 37.300 | 0.509 |
| −0.203 | 37.300 | 0.414 |
| −0.246 | 37.300 | 0.317 |
| −0.288 | 37.300 | 0.220 |
| −0.327 | 37.300 | 0.121 |
| −0.364 | 37.300 | 0.022 |
| −0.400 | 37.300 | −0.078 |
| −0.433 | 37.300 | −0.178 |
| −0.465 | 37.300 | −0.279 |
| −0.495 | 37.300 | −0.381 |
| −0.523 | 37.300 | −0.483 |
| −0.549 | 37.300 | −0.586 |
| −0.574 | 37.300 | −0.689 |
| −0.596 | 37.300 | −0.792 |
| −0.618 | 37.300 | −0.896 |
| −0.637 | 37.300 | −1.000 |
| −0.655 | 37.300 | −1.104 |
| −0.672 | 37.300 | −1.209 |
| −0.687 | 37.300 | −1.314 |
| −0.702 | 37.300 | −1.419 |
| −0.715 | 37.300 | −1.524 |
| −0.728 | 37.300 | −1.629 |
| −0.739 | 37.300 | −1.734 |
| −0.751 | 37.300 | −1.839 |
| −0.761 | 37.300 | −1.945 |
| −0.770 | 37.300 | −2.050 |
| −0.779 | 37.300 | −2.156 |
| −0.788 | 37.300 | −2.262 |
| −0.788 | 37.300 | −2.272 |
| −0.785 | 37.300 | −2.283 |
| −0.778 | 37.300 | −2.292 |
| −0.770 | 37.300 | −2.298 |
| −0.759 | 37.300 | −2.302 |
| −0.749 | 37.300 | −2.302 |
| −0.738 | 37.300 | −2.298 |
| −0.730 | 37.300 | −2.292 |
| −0.724 | 37.300 | −2.283 |
| 1.425 | 38.900 | 2.285 |
| 1.382 | 38.900 | 2.190 |
| 1.333 | 38.900 | 2.098 |
| 1.282 | 38.900 | 2.008 |
| 1.230 | 38.900 | 1.918 |
| 1.177 | 38.900 | 1.828 |
| 1.124 | 38.900 | 1.739 |
| 1.071 | 38.900 | 1.649 |
| 1.019 | 38.900 | 1.559 |
| 0.967 | 38.900 | 1.469 |
| 0.915 | 38.900 | 1.379 |
| 0.864 | 38.900 | 1.288 |
| 0.813 | 38.900 | 1.198 |
| 0.762 | 38.900 | 1.107 |
| 0.712 | 38.900 | 1.016 |
| 0.662 | 38.900 | 0.925 |
| 0.612 | 38.900 | 0.833 |
| 0.563 | 38.900 | 0.742 |
| 0.514 | 38.900 | 0.650 |
| 0.466 | 38.900 | 0.558 |
| 0.418 | 38.900 | 0.466 |

TABLE 1-continued

| X | Y | Z |
|---|---|---|
| 0.370 | 38.900 | 0.374 |
| 0.322 | 38.900 | 0.281 |
| 0.275 | 38.900 | 0.188 |
| 0.228 | 38.900 | 0.096 |
| 0.182 | 38.900 | 0.003 |
| 0.135 | 38.900 | −0.091 |
| 0.089 | 38.900 | −0.184 |
| 0.044 | 38.900 | −0.277 |
| −0.001 | 38.900 | −0.371 |
| −0.046 | 38.900 | −0.465 |
| −0.090 | 38.900 | −0.559 |
| −0.134 | 38.900 | −0.653 |
| −0.177 | 38.900 | −0.748 |
| −0.219 | 38.900 | −0.843 |
| −0.260 | 38.900 | −0.938 |
| −0.301 | 38.900 | −1.034 |
| −0.340 | 38.900 | −1.130 |
| −0.379 | 38.900 | −1.227 |
| −0.416 | 38.900 | −1.324 |
| −0.452 | 38.900 | −1.422 |
| −0.487 | 38.900 | −1.520 |
| −0.520 | 38.900 | −1.618 |
| −0.552 | 38.900 | −1.717 |
| −0.581 | 38.900 | −1.817 |
| −0.609 | 38.900 | −1.917 |
| −0.635 | 38.900 | −2.018 |
| −0.660 | 38.900 | −2.119 |
| −0.685 | 38.900 | −2.220 |
| −0.711 | 38.900 | −2.320 |
| 1.433 | 38.900 | 2.308 |
| 1.439 | 38.900 | 2.333 |
| 1.441 | 38.900 | 2.358 |
| 1.438 | 38.900 | 2.382 |
| 1.424 | 38.900 | 2.403 |
| 1.401 | 38.900 | 2.412 |
| 1.376 | 38.900 | 2.412 |
| 1.352 | 38.900 | 2.406 |
| 1.328 | 38.900 | 2.397 |
| 1.306 | 38.900 | 2.386 |
| 1.213 | 38.900 | 2.330 |
| 1.125 | 38.900 | 2.266 |
| 1.040 | 38.900 | 2.197 |
| 0.958 | 38.900 | 2.125 |
| 0.879 | 38.900 | 2.050 |
| 0.801 | 38.900 | 1.974 |
| 0.725 | 38.900 | 1.896 |
| 0.651 | 38.900 | 1.816 |
| 0.579 | 38.900 | 1.734 |
| 0.509 | 38.900 | 1.651 |
| 0.440 | 38.900 | 1.566 |
| 0.374 | 38.900 | 1.480 |
| 0.309 | 38.900 | 1.392 |
| 0.246 | 38.900 | 1.303 |
| 0.184 | 38.900 | 1.213 |
| 0.124 | 38.900 | 1.122 |
| 0.066 | 38.900 | 1.030 |
| 0.010 | 38.900 | 0.937 |
| −0.044 | 38.900 | 0.842 |
| −0.097 | 38.900 | 0.747 |
| −0.147 | 38.900 | 0.650 |
| −0.195 | 38.900 | 0.552 |
| −0.241 | 38.900 | 0.454 |
| −0.285 | 38.900 | 0.354 |
| −0.327 | 38.900 | 0.253 |
| −0.367 | 38.900 | 0.152 |
| −0.404 | 38.900 | 0.049 |
| −0.439 | 38.900 | −0.054 |
| −0.472 | 38.900 | −0.158 |
| −0.503 | 38.900 | −0.262 |
| −0.531 | 38.900 | −0.367 |
| −0.558 | 38.900 | −0.473 |
| −0.583 | 38.900 | −0.579 |
| −0.606 | 38.900 | −0.686 |
| −0.627 | 38.900 | −0.793 |
| −0.647 | 38.900 | −0.900 |
| −0.665 | 38.900 | −1.007 |
| −0.681 | 38.900 | −1.115 |
| −0.695 | 38.900 | −1.223 |
| −0.708 | 38.900 | −1.331 |
| −0.720 | 38.900 | −1.440 |
| −0.731 | 38.900 | −1.548 |
| −0.740 | 38.900 | −1.657 |
| −0.749 | 38.900 | −1.765 |
| −0.757 | 38.900 | −1.874 |
| −0.765 | 38.900 | −1.983 |
| −0.772 | 38.900 | −2.091 |
| −0.779 | 38.900 | −2.200 |
| −0.786 | 38.900 | −2.309 |
| −0.785 | 38.900 | −2.321 |
| −0.782 | 38.900 | −2.332 |
| −0.775 | 38.900 | −2.341 |
| −0.765 | 38.900 | −2.348 |
| −0.754 | 38.900 | −2.352 |
| −0.743 | 38.900 | −2.352 |
| −0.732 | 38.900 | −2.348 |
| −0.722 | 38.900 | −2.341 |
| −0.715 | 38.900 | −2.332 |

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive.

From the foregoing, it will be seen that this invention is well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A compressor component having an attachment, a platform extending outward from the attachment and an airfoil extending radially outward from the platform, the airfoil having an uncoated profile in accordance with Cartesian coordinate values of X and Z, for each distance Y in inches as set forth in Table 1, carried to three decimal places, wherein Y is a distance measured radially outward from an engine centerline, the X and Z coordinate values being joined in smooth continuing splines to form airfoil sections and the airfoil sections joined smoothly to form the profile.

2. The compressor component of claim 1, wherein the airfoil has a root end proximate the attachment and a tip end spaced at opposite the root end.

3. The compressor component of claim 1 further comprising a squealer tip at the tip end.

4. The compressor component of claim 1, wherein the compressor component is a stationary vane.

5. The compressor component of claim 4, wherein the compressor component is located adjacent to rotor blades of a compressor.

6. An airfoil for a compressor vane, the airfoil having an uncoated proportionately scalable profile in accordance with Cartesian coordinate values X, Y, and Z as set forth in Table 1, carried to three decimal places, the airfoil having manufacturing tolerances of +/−0.012 inches from the values set forth in Table 1, wherein Y is a distance measured radially outward from an engine centerline in inches, the X and Z coordinate values being joined in smooth continuing splines to form airfoil sections and the airfoil sections joined smoothly to form the profile, wherein the uncoated proportionately scalable profile is proportionately scalable in the X, Y, and Z directions from the Cartesian coordinate values X, Y, and Z as set forth in Table 1.

7. The airfoil of claim 6, wherein the airfoil has a first end and an opposing second end.

8. The airfoil of claim 7, wherein the first end is attached to a platform of a compressor vane.

9. The airfoil of claim 6 further comprising a squealer tip positioned at a second end of the airfoil opposite of the first end.

10. A compressor portion comprising a compressor casing having a plurality of compressor vanes extending radially from the compressor casing, each of the plurality of compressor vanes having an airfoil with an uncoated proportionately scalable nominal profile in accordance with Cartesian coordinate values X, Y, and Z, set forth in inches in Table 1, with the Y coordinate values at perpendicular distances from planes normal to a radius from an engine centerline, the airfoil having manufacturing tolerances of +/−0.012 inches from the values set forth in Table 1, wherein airfoil sections are defined at each distance Y by connecting the X and Z coordinate value with smooth continuing splines, and the airfoil sections are joined smoothly to form the airfoil profile, wherein the compressor vanes are located adjacent to a set of rotating compressor blades having an increased chord length, such that the compressor vanes have a corresponding decreased chord length to compliment the compressor blades.

11. The compressor of claim 10, wherein the plurality of compressor vanes each have a squealer tip positioned at a tip end of the airfoil.

12. The compressor component of claim 10, wherein the airfoil has a root end proximate the attachment and a tip end spaced opposite the root end.

13. The compressor component of claim 10, wherein each of the compressor vanes is a stationary vane.

* * * * *